United States Patent [19]

Douros et al.

[11] Patent Number: 4,716,575
[45] Date of Patent: Dec. 29, 1987

[54] ADAPTIVELY SYNCHRONIZED RING NETWORK FOR DATA COMMUNICATION

[75] Inventors: Bryan P. Douros, Natick; Andrew Marcuvitz, Cambridge, both of Mass.

[73] Assignee: Apollo Computer, Inc., Chelmsford, Mass.

[21] Appl. No.: 918,629

[22] Filed: Oct. 14, 1986

Related U.S. Application Data

[63] Continuation of Ser. No. 804,329, Dec. 4, 1985, abandoned, which is a continuation of Ser. No. 361,565, Mar. 25, 1982, abandoned.

[51] Int. Cl.⁴ .............................................. H04B 3/36
[52] U.S. Cl. ........................................ 375/3; 370/86; 370/108; 375/118
[58] Field of Search .......................... 375/3, 107, 118; 370/103, 108, 109, 43, 84, 86; 360/51

[56] References Cited

U.S. PATENT DOCUMENTS

| | | | |
|---|---|---|---|
| 3,050,586 | 8/1962 | Runyon | 370/103 |
| 3,306,978 | 2/1967 | Simmons et al. | 370/100 |
| 3,467,779 | 9/1969 | Duerdoth | 370/103 |
| 3,597,549 | 8/1971 | Farmer | 370/88 |
| 3,681,759 | 8/1972 | Hill, III | 370/86 |
| 3,781,815 | 12/1973 | Boudreau et al. | 370/86 |
| 3,992,580 | 11/1976 | Bittel et al. | 370/103 |
| 4,181,975 | 1/1982 | Jenkins | 375/118 |
| 4,270,183 | 5/1981 | Robinson et al. | 375/118 |
| 4,293,948 | 10/1981 | Soderblom | 370/86 |
| 4,392,234 | 7/1983 | Maruta | 375/118 |

OTHER PUBLICATIONS

Brubaker and Nash, "A New Generation of Integrated Avionic Synthesizers", Motorola Semiconductor Products Inc., Mar. 1971.
Nash, "Phase-Locked Loop Design Fundamentals", Motorola Semiconductor Product Inc., AN-55 application Note.

Primary Examiner—Michael A. Masinick
Assistant Examiner—Stephen Chin
Attorney, Agent, or Firm—Weingarten, Schurgin, Gagnebin & Hayes

[57] ABSTRACT

In a ring communication system, data is received by and retransmitted by a plurality of network interface units spaced along the ring. Each network interface unit includes an elastic storage buffer which is preferably less than two bits in length. A feedback loop in each unit continuously controls the data transmitting rate from the network interface unit as a function of the average number of data bits in the elastic storage buffer. By thus controlling the transmitting rate, delay of data in the elastic storage buffer is controlled. Each network interface unit provides some of the delay required to cause the sum of all delays in the ring to become a multiple of 360 degrees. The entire network thus stabilizes at a substantially common frequency which provides the necessary phase delays throughout the network to provide a total phase shift of a multiple of 360 degrees.

12 Claims, 9 Drawing Figures $f_C$ = CENTER FREQUENCY
$f_L$ = LOW FREQUENCY LIMIT
$f_H$ = HIGH FREQUENCY LIMIT

ADAPTIVELY SYNCHRONIZED RING NETWORK FOR DATA COMMUNICATION

This is a continuation of application Ser. No. 804,329, filed Dec. 4, 1985 which is a continuation of Ser. No. 361,565, filed Mar. 25, 1982, both now abandoned.

BACKGROUND OF THE INVENTION

The present invention is in the field of communications, and more particularly relates to high speed transmission of data between geographically remote data processing equipment topologically connected together so as to form a circular ring.

Generally in ring networks each piece of data processing equipment is coupled to the ring by way of Network Interface Units (NIU's) at a "node" of the network. The nodes are connected by a data transmission medium, each of the next, so as to form a single circular signal path which permits unidirectional signal flow.

Within the Network Interface Unit (NIU) of such a network it is common practice to electrically repeat (or regenerate) data as it passes through a node. Incoming data is received and demodulated so that it may be selectively inspected and/or modified by associated data processing equipment coupled to the NIU. Then the inspected data is remodulated and transmitted in order that other nodes may inspect or modify the data. By demodulating and then remodulating within each node, data may be modified as it is transmitted around the ring. As a secondary benefit, the transmitted signal is fortified and reshaped as it is repeated by each node of network allowing nodes to be physically distant.

Because of the physical separation of the nodes it is common practice to allow each node to transmit data at a rate that varies slightly from the others. This eliminates the problem of strictly enforcing a rule that each of an arbitrary number of nodes transmits at exactly the same bit rate.

This practice has several disadvantages. First, because the rate at which information is received by a node (i.e. the rate that it is transmitted by its upstream neighbor) may be slightly different from the rate that it is transmitted, data bits will necessarily accumulate in or drain out of a node. As a result, in one form of prior art system it is required that some sort of first-in/first-out (FIFO) buffer absorb the excess bits when bits are received faster than they are transmitted. Alternatively this buffer must supplement a shortage of bits when bits are transmitted faster than they are received.

As a further disadvantage, the FIFO buffer used to resolve the disparate transmit and receive rates must periodically overflow or underflow at which time data transmission must be temporarily halted. Also, the larger the FIFO, the more delay is inserted in the path followed by the data in going from the sending node to the receiving node. Conversely, short FIFO's will generally require critical control of transmit frequencies or more frequent halting of transmissions.

Alternatively, in another form of prior art system one node may be designated as a Master node, and all the remaining nodes are phase-locked to this Master node. In this way, each node except the Master, phase-locks to its upstream neighbor and thus indirectly to the Master. When this practice is employed, two disadvantages must be overcome. First, the designation of Master node needs to be periodically changed. This requires that some method be employed to select one and only one Master and that all other nodes reacquire phase-lock. Second, the Master node, when not transmitting, must be prepared to receive a signal with an arbitrary phase relationship to that that it transmits.

Both of these disadvantages stem from the requirement that on node operate differently from the rest.

It is an object of the present invention to provide an improved ring communications system.

SUMMARY OF THE INVENTION

Briefly, the present invention is a ring communications system. The system includes a unidirectional signal path coupling a plurality of nodes and forming a ring configuration. At each of the nodes is a network interface unit (NIU) coupled in series with the signal path. Each NIU includes an input demodulator device for receiving a modulated signal directed on the signal path towards the NIU. The input device demodulator is adapted to generate a RECEIVE CLOCK signal and a RECEIVE DATA signal from the received modulated signal. An output modulator device generates a transmit modulated signal from a TRANSMIT DATA signal and a TRANSMIT CLOCK signal. This output modulator device transmits the transmit modulated signal onto the signal path downstream from the NIU.

The NIU also includes a controller and an elastic storage buffer. The buffer includes a buffer input line adapted to receive the RECEIVE DATA signal from the input demodulator device. The buffer also includes a buffer output line adapted to apply the buffered data signal to the output modulator device. The buffer is a first-in/first-out (FIFO) storage element adapted for the storage of the RECEIVE DATA at an input bit rate determined by the RECEIVE CLOCK, and for transferring the stored data to the output modulator device on a first-in/first-out basis at an output bit rate determined by the transmit clock. The controller includes a generator for providing the TRANSMIT CLOCK so that the output bit rate is related to the number of data bits in the storage element.

With this configuration, in one form of the invention, each of the NIU's coupled along the signal path are operative to make a phase correction to the signal received by that respective NIU. In this form, each NIU stores an adaptively variable average number of data bits. Thus, the rephasing operation of the data is distributed over all the NIU's coupled to the signal path. In effect, each of the NIU's acts as a buffer, each absorbing a little of the phase delay in the signals around the ring.

In another form of the invention incorporating a plurality of NIU's of the type described above, the system may also include one or more additional NIU's. Each of the latter type NIU's stores a fixed average number of data bits. In this form, the NIU's of the first type each absorb a little of the phase delay around the ring. In this composite type system, the ratio of the two types of NIU's may be selected in view of comparative costs and other factors, such as capability of the respective NIU's to absorb their allocated share of the phase delay around the ring.

DESCRIPTION OF THE PREFERRED EMBODIMENT

Figure 1:
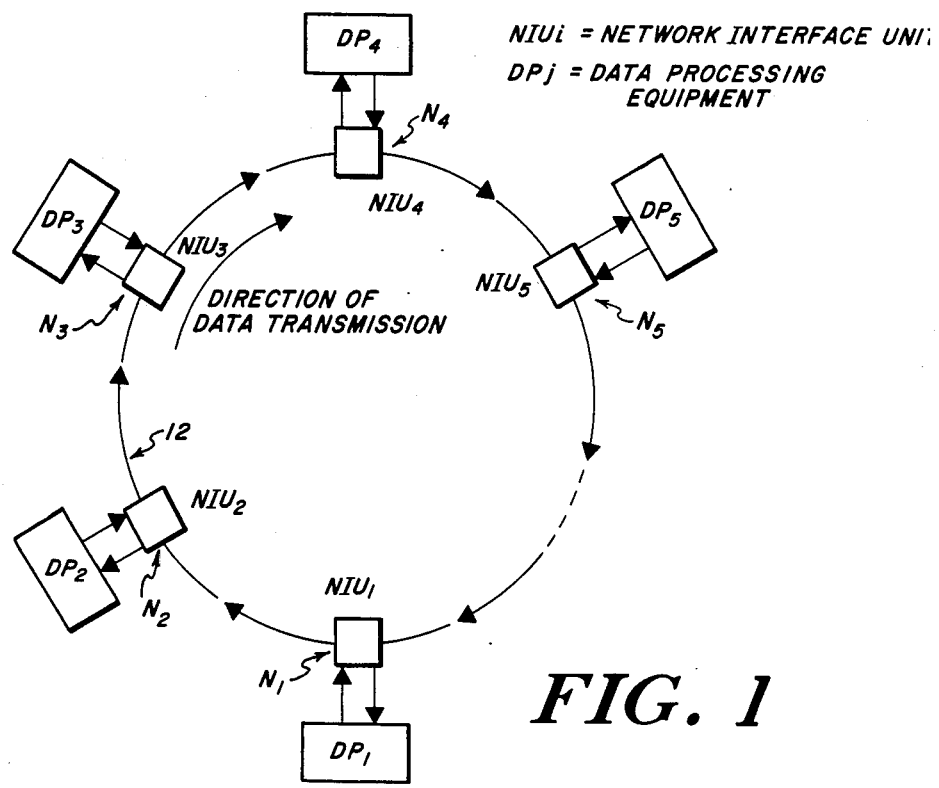
FIG. 1 is a ring network communications system embodying the present invention.

FIG. 1 shows a ring network communications system in accordance with the present invention. It includes a unidirectional signal path 12 having a plurality of nodes N1,N2, ... Nk at different locations along the signal path 12. At each node Nj there is a Network Interface Unit (NIUj) that is coupled to an associated data processing unit (DPj) in a manner providing receive/transmit access to the network for that data processing unit.

Figure 2:
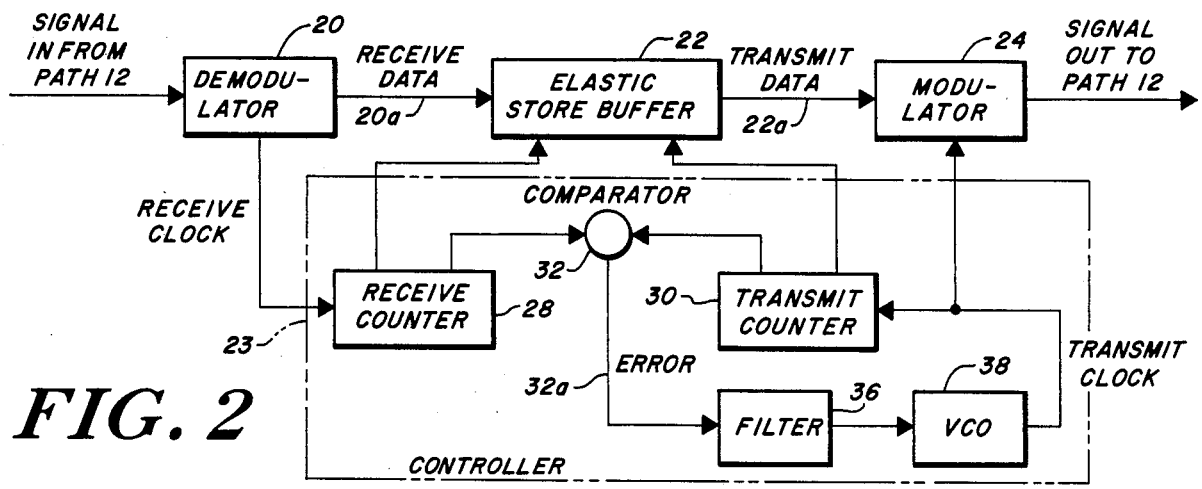
FIG. 2 is a block diagram of a network interface unit in the system of FIG. 1.

FIG. 2 shows in block diagram form an example of an NIU. The illustrated NIU includes an input demodulator 20, an output modulator 24, and an elastic storage buffer 22 and associated controller 23. In that NIU, a modulated input signal is separated into clock (RECEIVE CLOCK) and data (RECEIVE DATA) components by the demodulator 20. The RECEIVE DATA is fed by way of input line 20a to the elastic store buffer (ESB) 22.

TRANSMIT DATA is derived from the output of the ESB. The ESB has the capacity to store some number of bits on a first-in/first-out basis. The TRANSMIT DATA is coupled by way of an output line 22a to the modulator 24, where it is remodulated and then applied as an output signal on signal path 12.

The controller 23 includes a receive counter 28 and a transmit counter 30. A comparator 32 is coupled to counters 28 and 30 and provides an ERROR signal on line 32a. This ERROR signal is applied by way of a filter 36 to a voltage controlled oscillator (VCO) 38. The output of VCO 38 is applied as the TRANSMIT CLOCK to counter 30 and modulator 24.

In operation, counter 28 determines where in the ESB 22 each input data bit is placed. Counter 30 determines where in the ESB 22 each output data bit comes from. Counter 28 is controlled by the RECEIVE CLOCK, and Counter 30 is controlled by TRANSMIT CLOCK. Comparator 32 determines the fullness of the ESB 22 by comparing the state of the RECEIVE COUNTER to that of the TRANSMIT COUNTER. The ERROR signal from the comparator 32 is filtered by filter 36 and then used to control voltage controlled oscillator (VCO) 38. The output of the VCO 38 is used as the TRANSMIT CLOCK. With this configuration, when the TRANSMIT CLOCK frequency is increased relative to the RECEIVE CLOCK frequency, the ESB 22 will tend to become less full. Alternately, when the TRANSMIT CLOCK frequency is decreased relative to the RECEIVE CLOCK frequency, the ESB 22 will tend to become more full.

Figure 3:
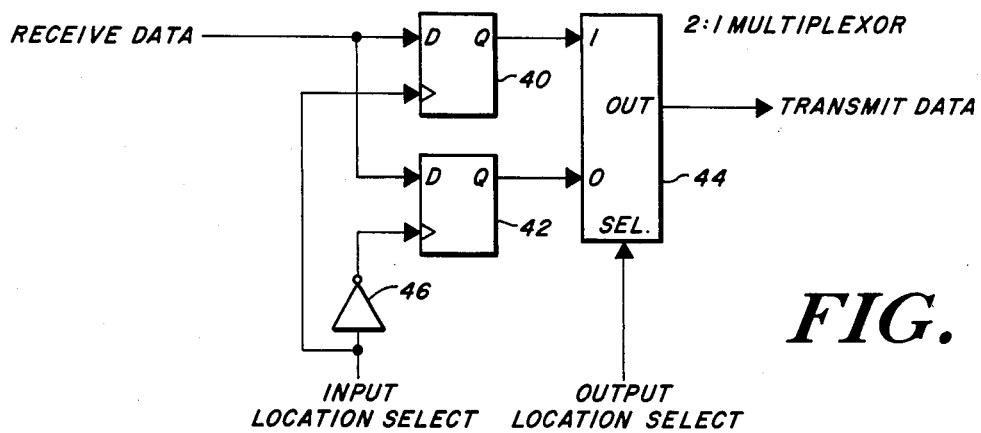
FIG. 3 is an elastic store buffer used in the network interface unit of FIG. 2.

FIG. 3 shows an exemplary form of the ESB 22. In the case illustrated, the ESB 22 stores up to 2 data bits at locations represented by flip-flop 40 and flip-flop 42. The ESB 22 stores incoming (RECEIVE DATA) data bits in one of the two flip-flops 40 and 42 based upon the logic transitions of an INPUT LOCATION SELECT signal. Inverter 46 causes high-low transitions to clock data into flip-flop 42, while low-high transitions clock data into flip-flop 40. 2 input-to-1 output multiplexor 44 selects either the data bit stored in flop-flop 40 or that stored in flip-flop 42 for output as TRANSMIT DATA. When an applied OUTPUT LOCATION SELECT signal is high, data is selected from flip-flop 40. Otherwise, data is selected from flip-flop 42.

Figure 4:
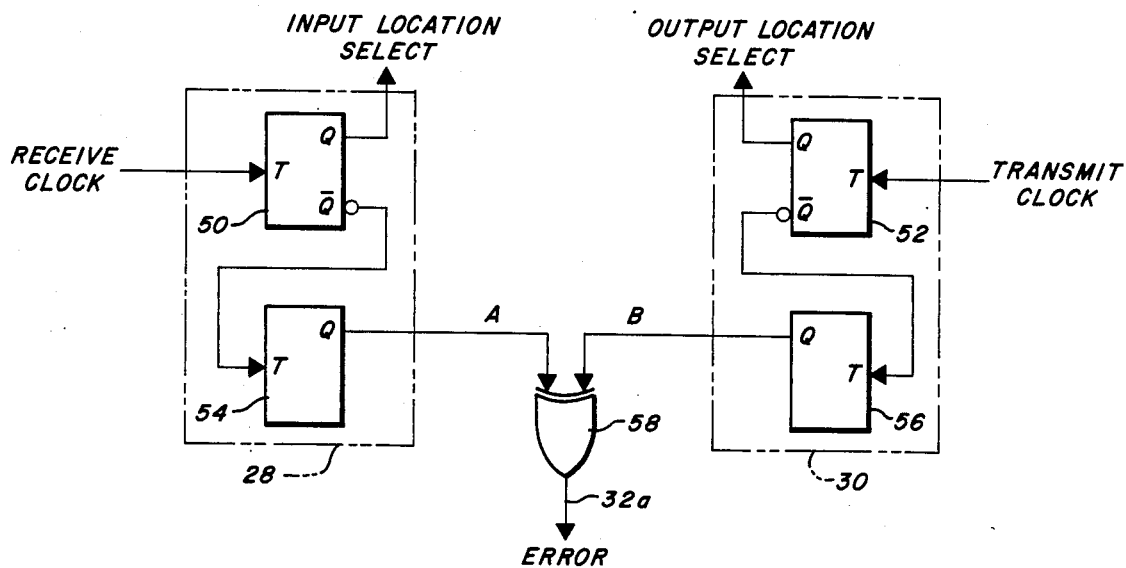
FIG. 4 is a more detailed illustration of th counters and comparator in the network interface unit of FIG. 2.

FIG. 4 shows an exemplary embodiment of the comparator 32, together with the receive counter 28 and the transmit counter 30. The ERROR signal from the comparator 32 provides a measure of the average number of bits in the ESB 22. The ERROR signal, after being filtered by filter 36, controls the rate that data bits are transmitted based on the rate that they are received. In the example illustrated in FIGS. 3 and 4, the comparator 32 produces an ERROR signal with a 50% duty cycle when the ESB 22 is half full (i.e. when time average of the number of bits contained in it is 1). If the ESB is more than half full the duty cycle of the ERROR signal is more than 50%, and if the ESB 22 is less than half full it will be less than 50%. In the extremes, the ERROR signal approaches a 0% duty cycle when the ESB is empty and approaches 100% when the ESB is full.

In FIG. 4, flip-flop 50 divides the frequency of RECEIVE CLOCK by two to produce the INPUT LOCATION SELECT signal. This signal alternately clocks received data bits into flip-flops 40 and 42 of the ESB 22. Similarly, flip-flop 52 divides the frequency of TRANSMIT CLOCK by two to produce the OUTPUT LOCATION SELECT signal. This signal alternately selects the data bit to be transmitted from flip-flops 40 and 42 by affecting the select input of multiplexor 44.

Figure 5:
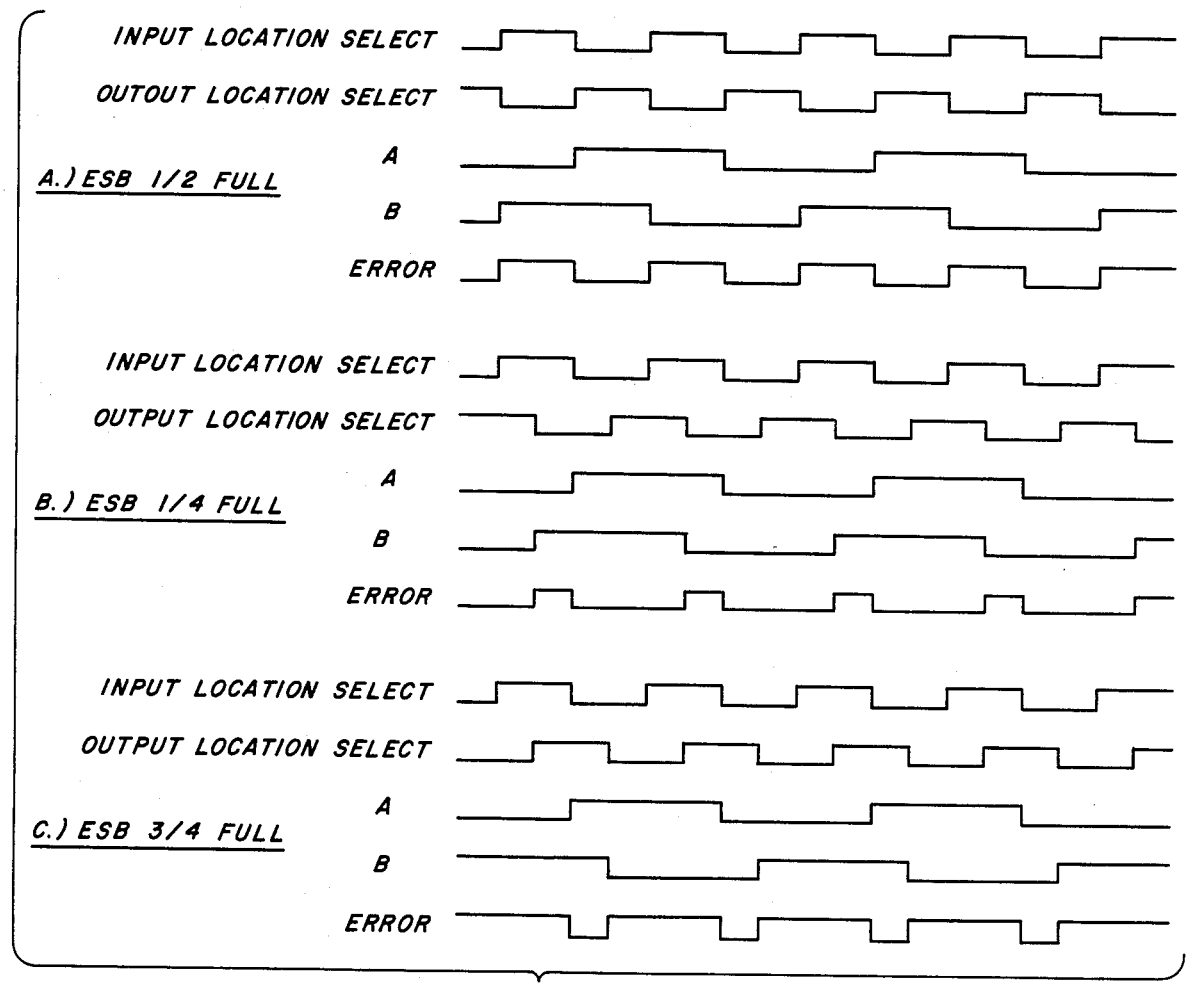
FIG. 5 is a timing chart illustrating operation of the network interface unit of FIG. 2.

The inverted outputs of flip-flops 50 and 52 are further frequency divided by two by flip-flops 54 and 56. The resulting signals are combined by exclusive-or gate 58 to produce the ERROR signal on line 32a. When the ESB 22 is half full, a receive data bit is clocked into one of flip-flops 40 and 42 at precisely the same time that a data bit to be transmitted is selected from the alternate flip-flop. This condition is depicted in FIG. 5a where A and B represent the states of flip-flops 54 and 56, respectively. FIG. 5b depicts the situation that the ESB is ¼ full. FIG. 5c depicts the situation that the ESB is ¾ full.

Elements 28,32,36,38, and 30 form a closed loop control system. The controlled variable is the average number of data bits in the ESB 22. This control loop attempts to keep the ESB 22 approximately half full by adjusting the transmit frequency (TRANSMIT CLOCK). The behavior of such systems is well known. Loop filter 36 determines the response characteristics of this control system generally, and the tracking behavior and closed-loop transfer function in particular.

Figure 6:
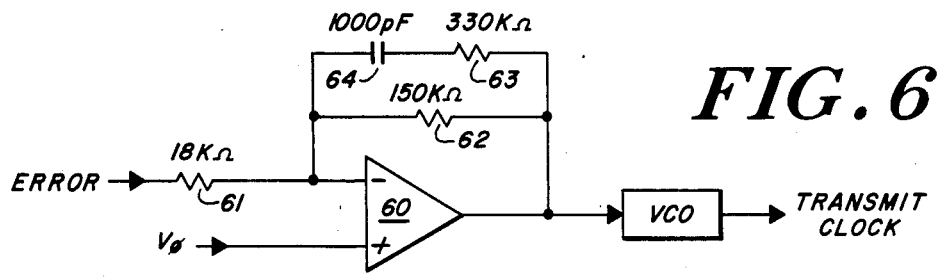
FIG. 6 is a more detailed schematic illustration of the filter and voltage control oscillator of the network interface unit of FIG. 2.
Figure 7:
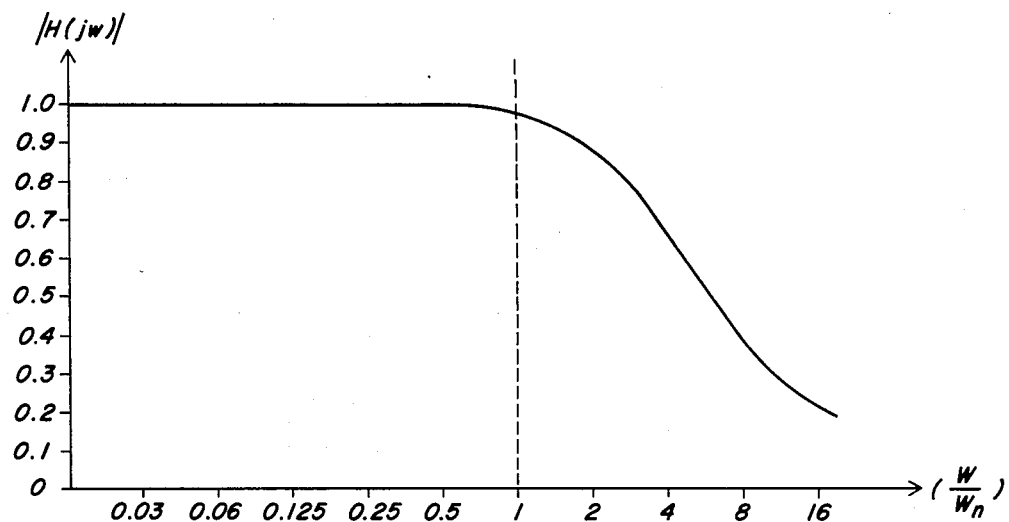
FIG. 7 is a graphical illustration of the closed loop transfer function of the network interface unit of FIG. 2.
Figure 8:
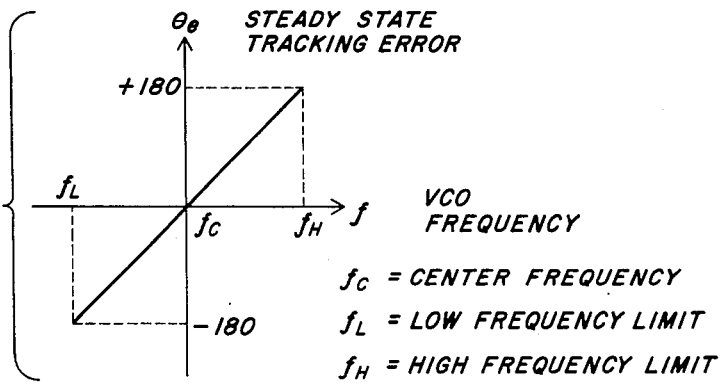
FIG. 8 is a graphical illustration of the steady-state tracking error of the network interface unit as a function of oscilator frequency.

FIG. 6 show an exemplary embodiment of the loop filter 36 which does not have a pole at the origin of a root locus plot of the filter characteristics. In this form, filter 36 includes an operational amplifier 60 and an RC network consisting of resistors 61,62,63 and capacitor 64. With this configuration, the VCO gain is selected to be on the order of 4000 radians/second-volt. Voltage VO is set to be half the sum of the highest and lowest voltages that the ERROR signal may attain. The closed loop control system containing filter 36 has two required properties. First, the steady-state tracking error is proportional to the VCO output frequency. Second, the magnitude of the closed-loop transfer function of phase correction in the network interface unit data output signal for a given change in phase of the input signal, also called gain, is for all inputs less than unity in the steady state. FIG. 8 depicts a representative graph of steady-state tracking error as a function of VCO output frequency; and FIG. 7 depicts the closed loop transfer function.

Because the loop filter 36 introduces a tracking error that is a linear function of the VCO frequency, and because the VCO frequency tracks the RECEIVE CLOCK, the average number of bits in the ESB 22 is a linear function of the RECEIVE CLOCK frequency. Therefore, the phase relationship of the bit cells in the transmitted signal to that of the bit cells in the received signal is a linear function of the RECEIVE CLOCK frequency. This means that for some received bit rate, the ESB 22 would contain 1 bit (i.e. be half-full), and consequently, the received bit cells would be in phase (modulo 360 degrees) with the transmit bit cells. For greater received bit rates, the ESB 22 would be more than half-full, and the receive/transmit phase difference will be greater than zero but less than 360 degrees. For lesser received bit rates, the ESB 22 will be less than half-full and the receive/transmit phase delay will be greater than −360 but less than zero degrees.

Each NIU in such a ring network contributes a receive/transmit phase delay to the signal as it is regenerated around the network. This delay is based on the fullness of its ESB 22 which, in turn, is based on the bit rate that is received from the upstream neighbor NIU. The transmission medium also has an associated input/output delay for each segment, and this delay may change with time as physical changes occur in the network. However, for any physical configuration of a network, there is a data bit transmission rate such that the sum of each of the NIU receive/transmit phase delays plus the other arbitrary phase delays (e.g. those contributed by the transmission medium) will be equal to zero degrees.

Furthermore, once such a data bit transmission rate has been established, the ring network will stabily seek to maintain such a rate despite local peturbations in transmission rates or other physical changes in the data transmission media. For example, if the upstream neighbor of a NIUk begins to transmit bits at a faster rate, the ESB 22 in that NIU will become more full. This will cause it to increase its transmit rate and simultaneously increase its receive/transmit phase delay. These changes will be transmitted from NIU to NIU until the new transmit rate comes full circle and is received by NIUk. At this time, bit cells received by NIUk will have an additional phase delay because as NIUk propagated an increased transmit bit rate to each other NIU in the network, each such NIU correspondingly increased its receive/transmit phase delay. However, this newly received phase will serve to make the ESB and NIUk less full. (The sum of the phase delays around a circular network must always be 0 modulo 360 degrees. So, if some node increases its phase delay, another node must make an offsetting decrease.) Because its ESB is now less full, NIUk will lower its transmit bit rate and this change will again be propagated around the network.

This feedback process repeats itself until a stable equilibrium transmit rate is reached. When this condition is reached, each NIU will be transmitting at a common bit rate and each will have a receive/transmit phase delay (or ESB fullness) that causes its VCO output frequency to correspond to this common transmit rate. In the present embodiment, to aid in acquisition of the equilibrium condition, each ESB 22 is monitored for an overflow condition. Upon detection of that condition the receive and transmit counters are reset to a predetermined value.

Figure 9:
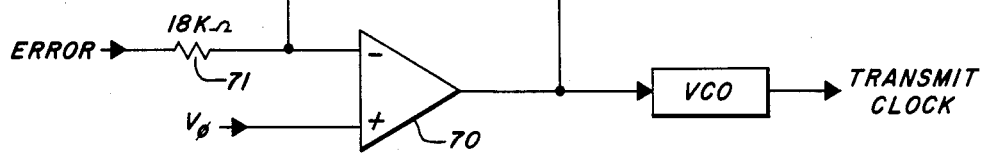
FIG. 9 is a schematic illustration of an alternative loop filter which may be used in conjunction with the present invention.

FIG. 9 shows an exemplary embodiment of loop filter 36 which constrains ESB 22 to store a fixed average number of data bits which has a pole at the origin of a root locus plot of filter characteristics. NIU's incorporating filters of the type of FIG. 9 may be used in conjunction with NIU's incorporating filters of the type of FIG. 6 in one form of the invention.

In all of the above described ring communications networks, the overall system forms a closed loop feedback control system. The controlled variable is the transmit bit rate and the feedback mechanism is the ring itself. This control system is stable because at least one NIU (when itself viewed as a control system) has a closed-loop transfer function that is for all inputs less than unity.

What is claimed is:

1. A ring communications system for a plurality of data processing units coupled to a network comprising:
   a plurality of substantially similar network interface units connected in series along a closed signal path ring for receiving, storing and retransmitting data bits along the closed signal path,
   each including a feedback loop for continuously controlling the data retransmitting bit rate of that network interface unit in response to a comparison between the phase of the transmitted data of that unit and the phase of the received data of that unit, and for varying the data residence delay between receipt and retransmission of data in the network interface unit, such that the steady state magnitude of the phase correction of the transmitted data for a given change in the phase of the received data bits is less than or equal to unity (1) for all network interface units, and less than unity (1) for at least one network interface unit, wherein
   the transmitting bit rate approaches the receiving bit rate, and,
   by cumulative action of the varying of the retransmitting bit rates and attendant delays of the plurality of network interface units, data transmission throughout the signal path ring is stabilized at a substantially common bit rate.

2. The ring communication system as claimed in claim 1 wherein the feedback loop in each of the plurality of network interface units comprises, in series, means for providing an error signal indicating the output phase deviation from the input bit rate in the network interface unit, a filter for filtering said error signals, and a voltage controlled oscillator, and wherein the output of said voltage controlled oscillator determines the data transmitting rate as a function of the error signal.

3. The improvement to a ring communications system as claimed in claim 2 wherein:

(a) each of the network interface units is adapted to store a maximum of two bits between receipt and retransmission thereof.

4. The ring communication system of claim 2, wherein said filter of at least one network interface unit includes no poles at the origin, providing said less than unity steady state correction in the network interface unit.

5. The ring communication system of claim 4, wherein said filter of at least one other network interface unit includes a pole at the origin, providing a phase-locked loop of at least a second order.

6. In a ring communication system comprising a unidirectional closed ring signal path including a plurality of network interface units (NIU's) coupled in series at spaced apart locations along the signal path for receiving and transmitting data throughout the closed signal path, wherein each of the NIU's includes:

input demodulator means including means for receiving a receive modulated signal directed towards the NIU on the receive signal path and means for generating a receive clock signal and a receive data signal from the receive modulated signal;

output modulator means including means for generating a transmit modulated signal from a transmit data signal and a transmit clock signal, and means for transmitting the transmit modulated signal directed away from the NIU on the signal path;

an elastic storage buffer (ESB) having a buffer input line adapted to receive the receive data signal from the input demodulator means and having a buffer output line adapted to apply the transmit data signal to the output modulator means, and wherein the ESB is a first-in/first-out (FIFO) storage element including means for storing the receiving data signal at an input data bit rate determined by the receive clock and means for transferring the stored data to the output modulator means on a first-in/first-out basis at an output data bit rate determined by the transmit clock; and controller means for generating the transmit clock as a function of the average number of data bit time periods in the storage element, wherein the elastic storage buffer includes:

(a) a first register including a first input line, a first output line, input means for transferring data on said first input line into said first register, and first output means for transferring data from said first register to said first output line;

(b) a second register including a second input line, a second output line, input means for transferring data on said second input line into said second register, and second output means for transferring data from said second register to said second output line;

(c) first switch means for alternately coupling the receive data signal on the buffer input line to said first and second input lines during alternate clock periods of the receive data clock signal;

(d) second switch means for alternately coupling said first and second output lines to the output modulator means by way of the buffer output line during alternate clock periods of the transmit clock signal; and further comprising the controller means including, (e) comparator means for generating a reference signal representative of the instantaneous average number of bits in said first and second registers by monitoring the switching states of said first and second switch means;

(f) filter means responsive to said reference signal for generating a filtered signal therefrom; and, (g) a voltage controlled oscillator responsive to said filtered signal and including means for generating a VCO signal at a frequency related to the amplitude of said filtered signal, said VCO signal corresponding to the transmit clock signal.

7. The system according to claim 6 wherein said first and second registers are each a bistable flip-flop for holding a single bit.

8. In a computer communications network comprising a unidirectional closed ring signal path having a plurality of network interface units (NIU's) coupled in series at spaced apart locations along the signal path for interfacing a computer to the network by receiving and transmitting data throughout the closed signal path wherein each of the NIU's includes:

an input demodulator including means for receiving a receive modulated signal directed towards the NIU on the receive signal path and means for generating a receive clock signal and a receive data signal from the receive modulated signal;

an output modulator including means for generating a transmit modulated signal from a transmit data signal and a transmit clock signal, and means for transmitting the transmit modulated signal directed away from the NIU on the signal path;

a first-in/first-out (FIFO) storage element having an input line adapted to receive the receive data signal from the input demodulator means and having an output line adapted to apply the transmit data signal to the output modulator means, and wherein the FIFO is adapted for storing the receive data signal at an input data bit rate determined by the receive clock and for transferring the stored data to the output modulator means at an output data bit rate determined by the transmit clock; and a controller for generating the transmit clock as a function of the average number of data bits in the FIFO, wherein (a) the FIFO includes:

(a1) a first bistable flip-flop for holding a single bit and having a first input line, a first output line, input means for transferring data on said first input line into said first flip-flop, and first output means for transferring data from said first flip-flop to said first output line;

(a2) a second bistable flip-flop for holding a single bit and having a second input line, a second output line, input means for transferring data on said second input line into said second flip-flop, and second output means for transferring data from said second flip-flop to said second output line;

(a3) first switch means for alternately coupling the receive data signal on the FIFO input line to said first and second input line during alternate clock periods of the receive data clock signal; and (a4) second switch means for alternately coupling said first and second output lines to the output modulator means by way of the FIFO output line during alternate clock periods of the transmit clock signal; and additionally comprising, (b) and wherein the controller includes:

(b1) counter means connected to said first and second switch means for monitoring and counting the switching states of said first and second switch means;

(b2) comparator means connected to said counter means for generating a reference signal representative of the instantaneous average number of bits in said first and second flip-flops;

(b3) filter means responsive to said reference signal for generating a filtered signal therefrom; and, (b4) voltage controlled oscillator means responsive to said filtered signal for generating the transmit clock as a VCO signal at a frequency related to said filtered signal thus varying the average number of data bits in said two flip-flops such that the output bit rate from said flip-flops approaches the input bit rate to said flip-flops whereby the cumulative controlling action of the interfacing units on the network causes the data transmission throughout the signal path to be stabilized at a substantially common bit rate causing the sum of all delays of the data bits in the signal path ring, including those due to passage of the bits through said flip-flops, to become a multiple of 360 degrees.

9. In a ring communication system comprising a unidirectional closed ring signal path including a plurality of network interface units (NIU's) coupled in series at spaced apart locations along the signal path for receiving and transmitting data throughout the closed signal path, wherein each of the NIU's includes input demodulator means including means for receiving a receive modulated signal directed towards the NIU on the receive signal path and means for generating a receive clock signal and a receive data signal from the receive modulated signal; output modulator means including means for generating a transmit modulated signal from a transmit data signal and a transmit clock signal, and means for transmitting the transmit modulated signal directed away from the NIU on the signal path; an elastic storage buffer (ESB) having a buffer input line adapted to receive the receive data signal from the input demodulator means and having a buffer output line adapted to apply the transmit data signal to the output modulator means, and wherein the ESB is a first-in/first-out (FIFO) storage element including means for storing the receive data signal at an input data bit rate determined by the receive clock and including at least a first and second register each having an input and an output line and means for transferring the stored data to the output modulator means on a first-in/first-out basis at an output data bit rate determined by the transmit clock; and, controller means for generating the transmit clock the method of transferring data through a network interface unit as part of a synchronous ring communication system comprising the steps of:

(a) transferring data on the first input line into the first register, and transferring data from the first register to the first output line;

(b) transferring data on the second input line into the second register, and transferring data from the second register to the second output line;

(c) alternately coupling the receive data signal on the buffer input line to the first and second input lines during alternate clock periods of the receive data clocks ignal;

(d) alternately coupling the first and second output lines to the output modulator means by way of the buffer output line during alternate clock periods of the transmit clock signal; and further comprising the controller means including, (e) generating a reference signal representative of the instantaneous average number of bits in the first and second registers by monitoring the switching states of the first and second switch means;

(f) generating a filtered signal from the reference signal; and, (g) generating a VCO signal at a frequency related to the amplitude of the filtered signal and using the VCO signal for the transmit clock signal.

10. A method of synchronous data communication in a ring communication system of serial connected network interface units comprising the steps of:

repeating data at each said network interface unit, including the steps of:
receiving data at a receive clock signal rate;
storing the received data in a storage buffer;
generating a transmit clock signal;
monotonically adjusting the frequency of said transmit clock signal in response to the phase difference of said receive clock signal relative to said transmit clock signal; and
transmitting the stored data according to said transmit clock signal, wherein
said step of adjusting provides a delay between the data transmitted by a specific network interface unit and the same data received by the same network interface unit propagated through the ring communication system selected to substantially correspond to integer multiples of the receive clock signal interval of a network interface unit; and
said step of adjusting, in at least one network interface unit, includes adjusting the phase of the transmit clock signal to have a residual delay in said network interface unit providing a stable ring communication system having at least a nondiverging range of transmit clock rates at all network interface units.

11. The method of claim 10, further including the step of
adjusting the transmit clock rate in proportion to said residual delay.

12. A ring communication system comprising:
a plurality of network interface units connected in series along a closed signal path ring for receiving, storing, and retransmitting data bits along the closed signal path,
each including a feedback control means for continuously and simultaneously adjusting both the data retransmission rate and the phase delay between the received data and the retransmitted data wherein:
the data retransmission rate continuously approaches the received data rate,
the phase delay between received data bits and their retransmitted counterparts is a monotonic function of the retransmitted data rate and in the range at least from 0 to 360 degrees based on the retransmitted data rate, and
the closed loop transfer function of the feedback control means has steady state closed loop transfer function that is for all inut values less than unity so that by cumulative action of the varying of the retransmitted data bit rate and the varying phse delay between the received data and the retransmitted data of each of the plurality of network interface units, data transmission throughout the signal path ring is stabilized at a substantially common bit rate.

* * * * *

UNITED STATES PATENT AND TRADEMARK OFFICE
CERTIFICATE OF CORRECTION

PATENT NO. : 4,716,575
DATED : December 29, 1987
INVENTOR(S) : Bryan P. Douros and Andrew Marcuvitz It is certified that error appears in the above-identified patent and that said Letters Patent is hereby corrected as shown below:

Column 1, line 19, "each of the" should read --each to the--

Column 2, line 7, "on node" should read --one node--

Column 5, line 8, "function of" should read --function or--

Column 7, line 38, "receiving data" should read --receive data--
Column 8, line 61, "input line" should read --input lines--
Column 9, line 63, "clocks ignal;" should read --clock signal;--
Column 10, line 60, "inut values" should read --input values--
line 63, "phse" should read --phase--

Signed and Sealed this

Sixteenth Day of May, 1989

Attest:

DONALD J. QUIGG

Attesting Officer

Commissioner of Patents and Trademarks